(12) United States Patent
Zeuner et al.

(10) Patent No.: US 11,884,203 B2
(45) Date of Patent: Jan. 30, 2024

(54) SHOCK-ABSORBING VEHICLE HEADLIGHT SYSTEM

(71) Applicant: ZKW Group GmbH, Wieselburg (AT)

(72) Inventors: Markus Zeuner, Mank (AT); Markus Bemmerl, Loosdorf (AT)

(73) Assignee: ZKW Group GmbH, Wieselburg (AT)

(*) Notice: Subject to any disclaimer, the term of this patent is extended or adjusted under 35 U.S.C. 154(b) by 0 days.

(21) Appl. No.: 18/206,797

(22) Filed: Jun. 7, 2023

(65) Prior Publication Data
US 2023/0406193 A1    Dec. 21, 2023

(30) Foreign Application Priority Data
Jun. 21, 2022 (EP) .................................. 22180173

(51) Int. Cl.
*B60Q 1/04* (2006.01)

(52) U.S. Cl.
CPC ......... *B60Q 1/0491* (2013.01); *B60Q 1/0441* (2013.01)

(58) Field of Classification Search
CPC .................................................... B60Q 1/0491
See application file for complete search history.

(56) References Cited

U.S. PATENT DOCUMENTS

| 5,327,330 | A * | 7/1994 | Van Oel | F21S 45/33 |
| | | | | 362/267 |
| 2016/0311361 | A1 * | 10/2016 | Kawamura | B60Q 1/04 |
| 2020/0324684 | A1 | 10/2020 | Pakiman | |
| 2023/0191983 | A1 * | 6/2023 | Zeuner | B60Q 1/0491 |
| | | | | 362/459 |

FOREIGN PATENT DOCUMENTS

| DE | 19732301 A1 * | 2/1998 | ........... B60Q 1/0416 |
| DE | 10257267 A1 | 6/2004 | |
| DE | 102011122450 A1 | 6/2013 | |
| FR | 2983142 A1 | 5/2013 | |
| JP | H03208738 A | 9/1991 | |

OTHER PUBLICATIONS

English translation of Dolla DE-19732301-A1 published Feb. 1998 (Year: 1998).*
Extended European Search Report Issued in EP Application No. 22180173.1 dated Dec. 7, 2022 (5 Pages).

* cited by examiner

*Primary Examiner* — Evan P Dzierzynski
(74) *Attorney, Agent, or Firm* — Eversheds Sutherland (US) LLP

(57) ABSTRACT

Shock-absorbing vehicle headlight system, having a vehicle frame element, a vehicle headlight housing, two release elements and a release mechanism connected to the vehicle frame element and designed to transition the vehicle headlight housing between a basic position and an adjustment position. The release mechanism includes a blocking element, switchable between a blocking position (BP) and a release position (RP). The vehicle headlight housing is held in the basic position in the BP and transitions to the adjustment position in the RP. A force transmission device mechanically couples the blocking element to the release elements and includes a rotary shaft and a control element. Displacement of each release element can be converted into rotary movement of the rotary shaft, which in turn can be converted into rotary movement of the control element, which is operatively connected to the blocking element in order to push the blocking element into the RP.

15 Claims, 4 Drawing Sheets

SHOCK-ABSORBING VEHICLE HEADLIGHT SYSTEM

CROSS-REFERENCE TO RELATED APPLICATIONS

This application claims priority to European Patent Application No. 22180173.1, filed Jun. 21, 2022, which is incorporated herein by reference.

FIELD OF THE INVENTION AND DESCRIPTION OF PRIOR ART

The invention relates to a shock-absorbing vehicle headlight system having
- at least one vehicle frame element that can be fixedly connected to a vehicle,
- a vehicle headlight housing, held pivotably and/or displaceably on the vehicle frame element, having at least one guide means connected to the vehicle headlight housing, which is preferably fixedly connected to the vehicle headlight housing, wherein the vehicle frame element has at least one guide for receiving and guiding the guide means, wherein the guide means engages with the guide such that the vehicle headlight housing is guided along the guide by moving the guide means and thus can be pivoted and/or displaced with respect to the vehicle frame element,
- at least two release elements which can be mechanically connected to a body element, in particular a bumper, of a vehicle and which are spatially spaced apart from one another, and
- at least one release mechanism, which is at least partially connected to the vehicle frame element and designed, as a function of the positions of the at least two release elements, to effect a transition between a basic position, in which the vehicle headlight housing is not pivoted and/or not displaced relative to the vehicle frame element, and an adjustment position, in which the vehicle headlight housing is displaced in a linear direction relative to the vehicle frame element and/or is pivoted about a pivot axis.

Shock-absorbing vehicle headlight systems are known in the prior art in order to protect pedestrians, cyclists or more generally vulnerable road users in the event of a collision with a vehicle. These usually have a spring-mounted headlight housing, which is designed to absorb impact energy in the event of a collision between the vehicle and a pedestrian. Document EP 1332915 B1 discloses a shock-absorbing vehicle headlight according to the prior art.

Disadvantageously, the spring mounting of the headlight housing causes undesired movements of the headlight housing even during normal driving. In particular, vibrations that occur during normal driving can cause undesired movement or displacement of the headlight housing. An increase in the rigidity of the system would, however, run counter to the intended protection of pedestrians.

SUMMARY OF THE INVENTION

An aim of the invention therefore consists in creating a shock-absorbing vehicle headlight system, which provides reliable pedestrian protection and has a high level of rigidity at the same time.

This object is achieved by a shock-absorbing vehicle headlight system having the features of claim 1. Preferred embodiments are specified in the dependent claims.

According to the invention, the at least one release mechanism comprises the following:
- a blocking element, which is held in a linearly displaceable manner in the at least one release mechanism, wherein the blocking element is designed, as a function of the positions of the release elements, to switch between a blocking position and a release position, wherein in the blocking position, an engagement section of the blocking element engages with a corresponding engagement section of the vehicle frame element in order to hold the vehicle headlight housing in the basic position, wherein in the release position, the engagement section of the blocking element is arranged outside of the corresponding engagement section of the vehicle frame element in order to effect a transition of the vehicle headlight housing from the basic position to the adjustment position, wherein a first spring element is provided, which exerts a first spring force on the blocking element, pushing it into the blocking position,
- a force transmission device, which mechanically couples the blocking element to the at least two release elements, wherein the force transmission device comprises at least one rotary shaft and a control element, wherein the at least two release elements are mechanically coupled to the at least one rotary shaft in such a manner that an individual displacement of each of the at least two release elements can be converted into a rotary movement of the at least one rotary shaft, wherein the control element is mechanically coupled to the at least one rotary shaft in such a way that a rotary movement of the at least one rotary shaft can be converted into a rotary movement of the control element, wherein the control element is operatively connected to the blocking element in such a manner that the blocking element can be pushed into the release position against the first spring force of the first spring element by means of a rotary movement of the control element.

This has the advantage that during normal driving, the vehicle headlight housing is held in the basic position by the blocking element and thus the vehicle headlight housing is attached in a substantially stationary manner to the vehicle frame element, and in the event of a collision with a road user, which can be detected with each of the at least two release elements, the release mechanism releases the vehicle headlight housing, whereby this can move into the adjustment position, wherein impact energy is absorbed during this transition.

Advantageously, the displacement of the vehicle headlight housing thus only occurs in the event of a collision.

In particular, it can be provided that the at least two release elements are axially spaced apart from one another along an axis of rotation of the at least one rotary shaft, and are mechanically coupled to the at least one rotary shaft in such a manner that the at least two release elements respectively engage with the at least one rotary shaft at a radial distance from the axis of rotation in order to induce a rotary movement of the at least one rotary shaft by an individual displacement of each of the at least two release elements. The displacement of the at least two release elements can typically take place substantially in the circumferential direction of the rotary shaft, measured at the point at which the respective release element engages with the rotary shaft. When the vehicle headlight system is fitted to a vehicle, the displacement of the at least two release elements is in particular a movement towards the centre of the vehicle such that, for example, a collision with a pedestrian, which usually causes a relative movement of the bumper towards the centre of the vehicle, can be detected by means of the release elements, whereby the headlight can be unlocked and an evasive movement of the vehicle headlight housing can be effected.

It can further be provided that the mechanical coupling of the at least two release elements to the at least one rotary shaft is respectively achieved via a connection element, wherein each connection element projects substantially radially from the at least one rotary shaft. In a state in which the vehicle headlight system is installed in a vehicle, the connection element preferably points towards the vehicle headlight in a central position, which is in particular oriented vertically upwards or downwards. The central position designates the position that lies in the centre between the maximum end positions of a working range of the connection element. The connection element in the blocking position of the blocking element is preferably in a first end position, and in the release position of the blocking element in a second end position, wherein during the transition between the blocking position and the release position, the connection element is pivoted from the first end position into the second end position. At the midpoint of the arc traversed by the connection element, the connection element points substantially vertically downwards or upwards, this being the middle position.

In particular, it can be provided that the at least two release elements are connected to the respective connection element via a hinged joint, preferably via a ball joint. This can result in a particularly low-friction transmission of motion between the at least two release elements and the respective connection element.

It can further be provided that in a state in which the shock-absorbing vehicle headlight system is installed in a vehicle, the at least one rotary shaft lies substantially in a horizontal plane and the connection elements lie substantially in a vertical plane. As a result, the force transmission device can be designed to be particularly compact.

In particular, it can be provided that the rotary movement of the at least one rotary shaft that can be induced by the at least two release elements and the rotary movement that is transferred from the at least one rotary shaft to the control element have the same direction of rotation.

It can further be provided that the control element is substantially non-rotatably connected to the at least one rotary shaft. This enables a particularly efficient torque transmission between the control element and the at least one rotary shaft.

In particular, it can be provided that the force transmission device has at least two adjacent rotary shafts, wherein a first rotary shaft and a second rotary shaft are respectively mechanically coupled to at least two release elements, wherein the first rotary shaft and the second rotary shaft are oriented to one another in such a way that an axis of rotation of the first rotary shaft and an axis of rotation of the second rotary shaft are oriented at an angle of at least 5°, preferably between 10° and 30°, to one another. In particular, the first and second rotary shaft, as well as every further rotary shaft, are not coaxially arranged to one another. Advantageously, the rotary shafts can thus follow an arrow of the vehicle headlight housing.

Two or more rotary shafts can preferably be arranged within a plane, wherein adjacent rotary shafts are inclined to one another at angles of, for example, at least 5°, preferably between 10° and 30°.

It can further be provided that precisely one control element is arranged between adjacent rotary shafts.

In particular, it can be provided that the rotary movement of the control element pushing the blocking element into the release position against the first spring force of the first spring element requires a rotation of the control element by at least 10°, preferably at least 20°, particularly preferably at least 30°. In this way, it can be advantageously ensured that the blocking element is only released after a certain minimum displacement of the release element or after a minimum rotation of the control element. In other words, in particular, a minimum force acting on the release element is required, which induces the required minimum rotation of the control element in order to release the fixation of the vehicle headlight housing.

It can further be provided that the control element is operatively connected to the blocking element via an unlocking element arranged in a linearly displaceable manner in the at least one release mechanism in such a manner that a rotary movement of the control element can be converted into a linear displacement of the unlocking element, wherein the unlocking element is designed to engage with the blocking element such that in engagement, the linear displacement of the unlocking element pushes the engagement section of the blocking element into the release position. The unlocking element can be arranged relative to the at least two release elements in such a way that the linear displacement of the unlocking element and the displacement of the at least two release elements occur in substantially parallel planes.

In particular, it can be provided that the unlocking element has a substantially wedge-shaped contact section, which is designed to engage with a contact section of the blocking element that is complementary to the contact section of the unlocking element, wherein during the transition of the blocking element into the release position, the contact section of the unlocking element contacts the contact section of the blocking element for force transmission. In particular, the contact section of the unlocking element at least partially slides over the complementary contact section of the blocking element during the transition of the blocking element into the release position, wherein as a result, the blocking element is pushed out of the corresponding engagement section of the vehicle frame element.

It can further be provided that the shock-absorbing vehicle headlight system has at least two release mechanisms, wherein a first release mechanism is arranged on an upper side of the vehicle headlight housing and a second release mechanism is arranged on an opposite lower side of the vehicle headlight housing, wherein starting from each release mechanism, a mechanical arm coupled to the respective blocking element and displaceable together therewith extends substantially in the direction of the opposite release mechanism, wherein a rocker is formed between the two release mechanisms, wherein the arms engage with opposing ends of the rocker such that a downwards movement of the arm of the upper release mechanism is converted into an upwards movement of the arm of the lower release mechanism, whereby a mechanical release of the two release mechanisms is coupled together.

This advantageously increases the number of release elements that induce the release of the vehicle headlight housing. Collisions at various areas of the vehicle headlight housing can thus be detected and induce a release of the vehicle headlight housing.

In particular, it can be provided that a displacement of the first blocking element during the transition into its release position and a displacement of the second blocking element coupled thereto during the transition into its release position occur along a trajectory running in opposite, preferably anti-parallel, directions.

It can further be provided that a second spring element is arranged between the vehicle frame element and the vehicle headlight housing and is designed to push the vehicle headlight housing into the basic position by means of a second spring force such that the transition into the adjustment position occurs against the second spring force. This has the advantage that following a collision that causes a displacement of the vehicle headlight housing, the vehicle headlight housing can be pushed back into the basic position by means of the second spring force. A shock-absorbing and resettable vehicle headlight system can thus be provided.

In particular, it can be provided that the guide for receiving and guiding the guide means is formed as a straight or arc-shaped elongated hole. The guide means is preferably formed as a peg, wherein the peg is designed in such a way that it can be moved back and forth along the elongated hole.

The invention further relates to a motor vehicle, comprising a shock-absorbing vehicle headlight system according to the invention.

BRIEF DESCRIPTION OF THE DRAWINGS

The invention is outlined in more detail below based on an exemplary and non-limiting embodiment, which is illustrated in the figures. In the figures

In the following figures, unless otherwise stated, the same reference numbers denote the same features.

All figures are schematic and simplified representations of the invention, with non-essential components not being shown for a better overview.

DETAILED DESCRIPTION OF EMBODIMENTS OF THE INVENTION

Figure 1:
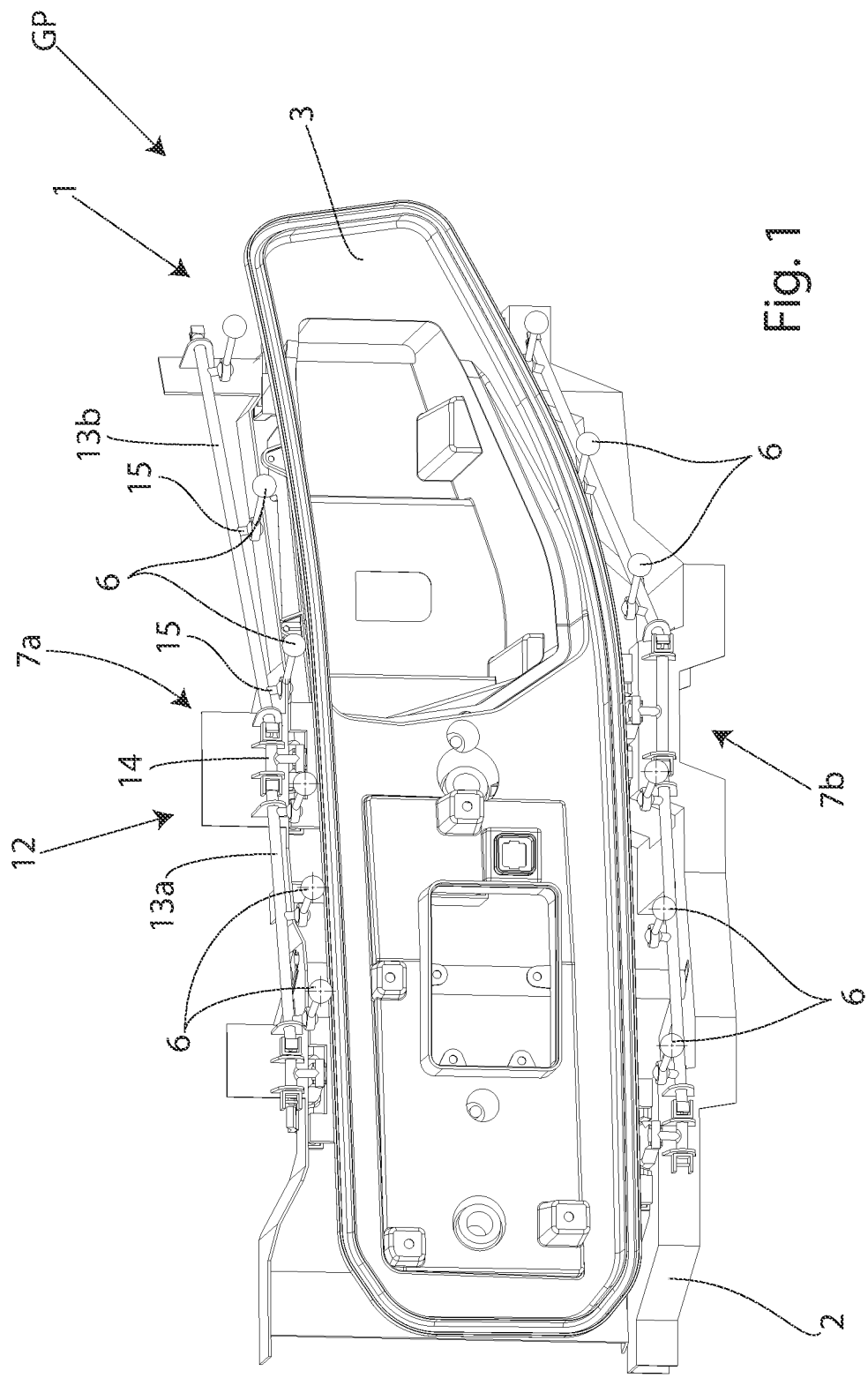
FIG. 1 shows a front view of an embodiment of a shock-absorbing vehicle headlight system according to the invention.
Figure 2:
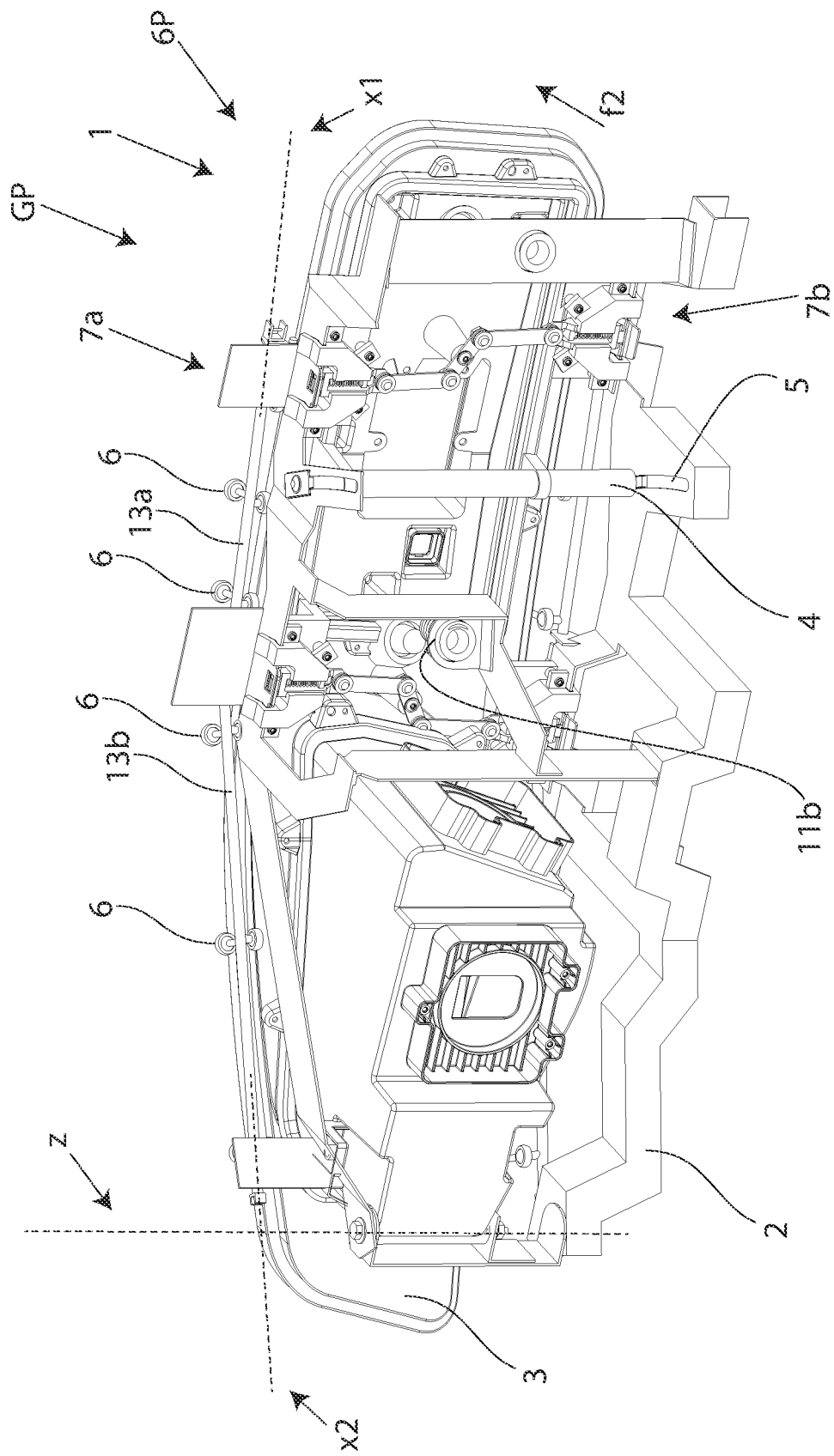
FIG. 2 shows a rear view of the shock-absorbing vehicle headlight system according to FIG. 1.

FIG. 1 shows a front view and FIG. 2 a rear view of an embodiment of a shock-absorbing vehicle headlight system 1 according to the invention, having at least one vehicle frame element 2 that can be fixedly connected to a vehicle and a vehicle headlight housing 3 held pivotably and/or displaceably on the vehicle frame element 2.

The vehicle headlight housing 3 is, preferably fixedly, connected to a guide means 4. The vehicle frame element 2 has at least one guide 5 for receiving and guiding the guide means 4, wherein the guide means 4 engages with the guide 5 such that the vehicle headlight housing 3 is guided along the guide 5 by moving the guide means 4 and thus can be pivoted and/or displaced with respect to the vehicle frame element 2. In the exemplary embodiment shown, the guide 5 is formed as an arc-shaped elongated hole.

The vehicle headlight system 1 further comprises at least two release elements 6 which can be mechanically connected to a body element, in particular a bumper, of a vehicle and which are spatially spaced apart from one another. In a state in which the vehicle headlight system 1 is installed in a vehicle and the release elements 6 are connected to a bumper, a displacement of the bumper towards the centre of the vehicle, which can be triggered by a collision of the vehicle (for example with a pedestrian), leads to a change in position of at least one of the at least two release elements 6, wherein the change in position of the release element 6 or release elements 6 is usually also a displacement towards the centre of the vehicle. Depending on the location on the bumper where an impact or collision occurs, a corresponding (or several) release element(s) 6 is/are displaced or moved.

The release elements 6 are connected to a release mechanism 7a, 7b described in detail below, wherein this is at least partially connected to the vehicle frame element 2. The release mechanism 7a, 7b is designed, as a function of the positions of the at least two release elements 6, to effect a transition between a basic position GP, in which the vehicle headlight housing 3 is not pivoted and/or not displaced relative to the vehicle frame element 2, and an adjustment position VP, in which the vehicle headlight housing 3 is displaced in a linear direction relative to the vehicle frame element 2 and/or is pivoted about a pivot axis z. The adjustment position VP is thus adapted in the course of a collision, wherein impact energy is absorbed during the transition to the adjustment position VP. The basic position GP is adopted during normal, collision-free travel, wherein the vehicle headlight housing 3 is held on the vehicle frame element 2 in a fixed or stationary manner in the basic position GP.

According to the invention, the vehicle headlight system 1 comprises at least one release mechanism 7a, 7b. In the exemplary embodiment shown, the vehicle headlight system 1 has four release mechanisms similar in terms of their mechanical mode of operation, wherein two of these release mechanism 7a, 7b (cf. FIG. 2 and the detail view FIG. 4) are provided with reference numbers and now explained in detail.

Figure 3:
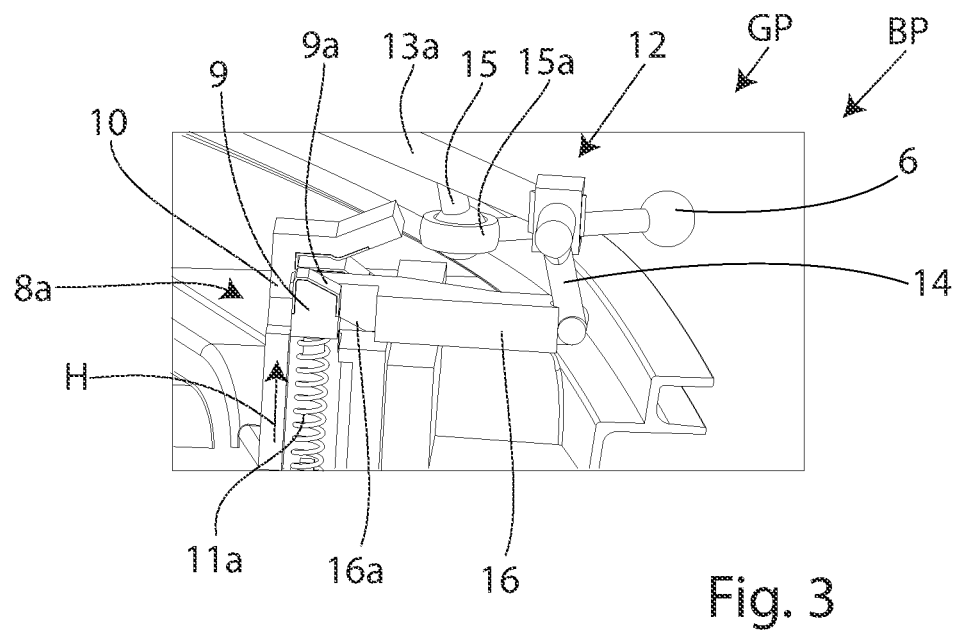
FIG. 3 shows a detail view of the shock-absorbing vehicle headlight system according to FIG. 1.
Figure 4:
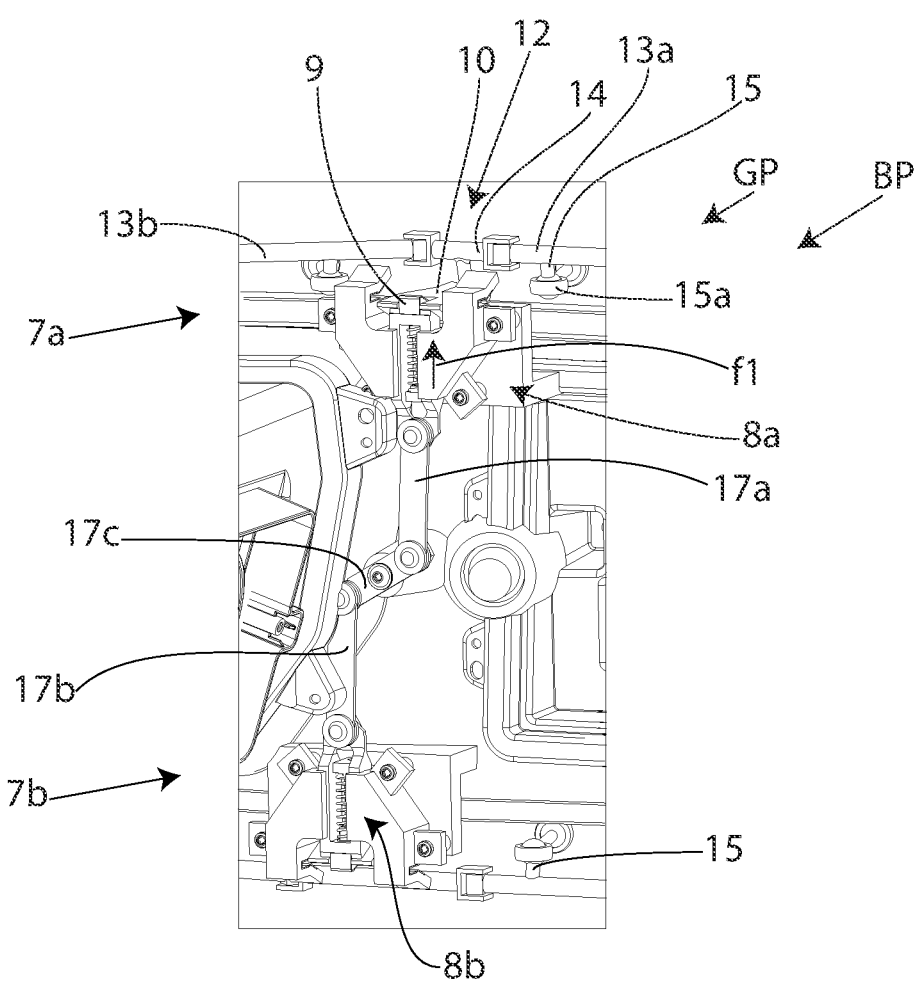
FIG. 4 shows a further detail view of the shock-absorbing vehicle headlight system according to FIG. 1.

As shown in FIG. 3 and FIG. 4, the release mechanisms 7a, 7b respectively comprise a blocking element 8a, 8b, which is held in a linearly displaceable manner in the respective release mechanism 7a, 7b. The blocking element 8a, 8b is designed, as a function of the positions of the release elements 6, to switch between a blocking position BP and a release position FP. A first spring element 11a pushes the blocking element 8a, 8b into the blocking position BP by means of the first spring force f1, wherein in the blocking position BP, an engagement section 9 of the blocking element 8a, 8b engages with a corresponding engagement section 10 of the vehicle frame element 2. This holds the vehicle headlight housing 3 in the basic position GP. In the release position FP (cf. FIG. 5c), the blocking element 8a, 8b or its engagement section 9 is pushed out of the corresponding engagement section 10 of the vehicle frame element 2 against the first spring force f1 in order to effect a transition of the vehicle headlight housing 3 from the basic position GP into the adjustment position VP. The guide means 4 moves along the guide 5 during the transition from the basic position GP into the adjustment position VP.

A force transmission device 12 is provided in order to release the release mechanisms 7a, 7b as a function of the positions of the at least two release elements 6. It mechanically couples the blocking element 8a, 8b to the at least two release elements 6. The force transmission device 12 comprises at least one rotary shaft 13a, 13b and a control element 14, wherein the at least two release elements 6 are mechanically coupled to the at least one rotary shaft 13a, 13b in order to convert an individual displacement of each of the at least two release elements 6 into a rotary movement of the at least one rotary shaft 13a, 13b. In the exemplary embodiment shown, the force transmission device 12 has two adjacent rotary shafts 13a, 13b, wherein a first rotary shaft 13a and a second rotary shaft 13b are respectively mechanically coupled to at least two release elements 6. The first rotary shaft 13a and the second rotary shaft 13b are oriented to one another in such a way that an axis of rotation x1 of the first rotary shaft 13a and an axis of rotation x2 of the second rotary shaft 13b are oriented at an angle of at least 5°, preferably between 10° and 30°, to one another. The release elements 6 are axially spaced apart from one another along the axes of rotation x1, x2 of the rotary shafts 13a, 13b.

The release elements 6 respectively engage with the respective rotary shaft 13a, 13b at a radial distance from the axes of rotation x1, x2 in order to induce a rotary movement of the corresponding rotary shaft 13a, 13b by an individual displacement of each of the release elements 6. The mechanical coupling of the release elements 6 to the respective rotary shafts 13a, 13b is respectively achieved via a connection element 15, wherein each connection element 15 projects substantially radially from the at least one rotary shaft 13a, 13b. The release elements 6 are connected to the respective connection element 15 via a hinged joint 15a, preferably via a ball joint. In a state in which the shock-absorbing vehicle headlight system 1 is installed in a vehicle, the rotary shafts 13a, 13b lie substantially in a horizontal plane and the connection elements 15 lie substantially in a vertical plane.

The control element 14 is mechanically coupled to the rotary shafts 13a, 13b in such a manner that a rotary movement of at least one rotary shaft 13a, 13b can be converted into a rotary movement of the control element 14. Precisely one control element 14 is arranged between adjacent rotary shafts 13a, 13b in the exemplary embodiment shown. The control element 14 is further operatively connected to the blocking element 8a, 8b in such a manner that the blocking element 8a, 8b can be pushed into the release position FP against the first spring force f1 of the first spring element 11a by means of a rotary movement of the control element 14. For this purpose, the control element 14 is operatively connected to the blocking element 8a, 8b via an unlocking element 16 arranged in a linearly displaceable manner in the release mechanism 7a, 7b such that a rotary movement of the control element 14 can be converted into a linear displacement of the unlocking element 16. The unlocking element 16 is in turn designed to engage with the blocking element 8a, 8b such that in engagement, the linear displacement of the unlocking element 16 pushes the engagement section 9 of the blocking element 8a, 8b into the release position FP. The unlocking element 16 has a substantially wedge-shaped contact section 16a, which is designed to engage with a contact section 9a of the blocking element 8a, 8b that is complementary to the contact section 16a of the unlocking element 16. During the transition of the blocking element 8a, 8b into the release position FP, the contact section 16a of the unlocking element 16 contacts the contact section 9a of the blocking element 8a, 8b for force transmission.

The rotary movement of the control element 14 pushing the blocking element 8a, 8b into the release position FP against the first spring force f1 of the first spring element 11a requires a rotation of the control element 14 by at least 10°, preferably at least 20°, particularly preferably at least 30°.

FIG. 4 shows a further detail view, wherein a first release mechanism 7a is arranged on an upper side of the vehicle headlight housing 3 and a second release mechanism 7b is arranged on an opposite lower side of the vehicle headlight housing 3. Starting from each release mechanism 7a, 7b, a mechanical arm 17a, 17b coupled to the respective blocking element 8a, 8b and displaceable together therewith extends substantially in the direction of the opposite release mechanism 7a, 7b. A rocker 17c is formed between the two release mechanisms 7a, 7b, wherein the arms 17a, 17b engage with opposing ends of the rocker 17c such that a downwards movement of the arm 17a of the upper release mechanism 7a is converted into an upwards movement of the arm 17b of the lower release mechanism 7b. A result, a mechanical release of the two release mechanisms 7a, 7b is coupled together.

A displacement of the first blocking element 8a during the transition into its release position and a displacement of the second blocking element 8b coupled thereto during the transition into its release position occurs along a trajectory running in opposite, preferably anti-parallel, directions.

In order to push the vehicle headlight housing 3 back into the basic position GP following a collision, a second spring element 11b, which exerts a second spring force f2, is arranged between the vehicle frame element 2 and the vehicle headlight housing 3. The displacement of the vehicle headlight housing 3 into the adjustment position VP thus occurs against the second spring force f2.

The invention is not limited to the embodiments shown, but is defined by the entire scope of protection of the claims. Individual aspects of the invention or embodiments may also be adopted and combined with each other. Any reference numbers in the claims are exemplary and merely serve to make the claims easier to read, without limiting them.

Figure 5C:
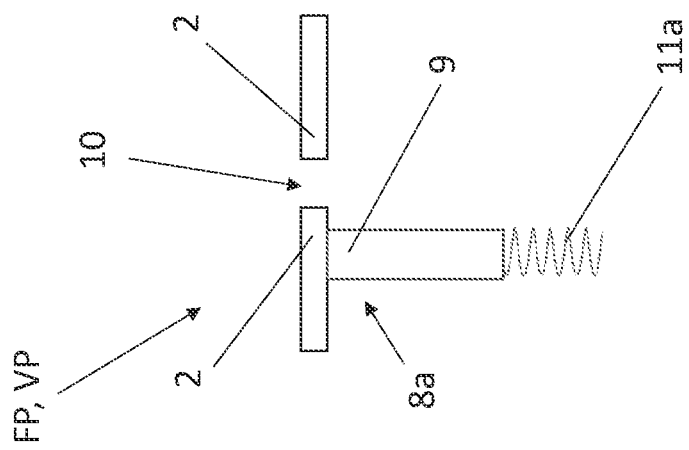
FIGS. 5a to 5c show schematic detail views of different positions of the shock-absorbing vehicle headlight system according to FIG. 1.
Figure 5B:
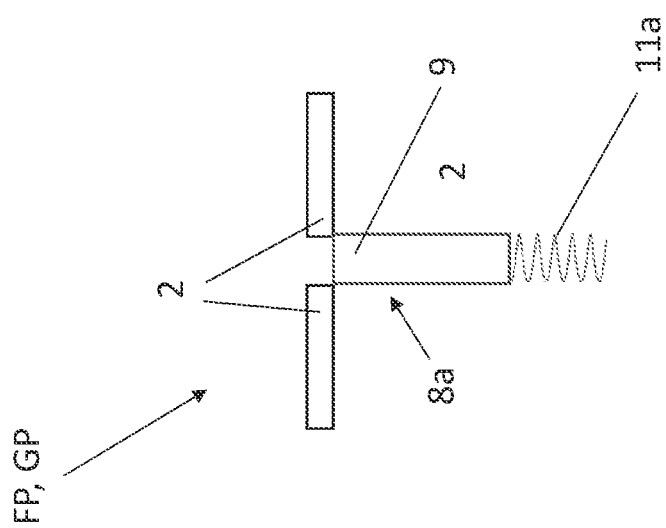
Figure 5A:
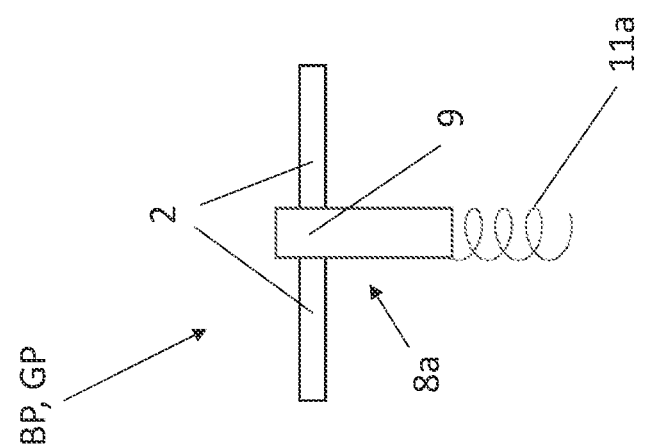

FIG. 5a shows a highly simplified schematic detail view of the vehicle headlight system 1 in the blocking position BP and basic position GP. The engagement section 9 of the blocking element 8a engages with the corresponding engagement section 10 of the vehicle frame element 2.

FIG. 5b shows a highly simplified schematic detail view of the vehicle headlight system 1 in the release position FP and basic position GP. The engagement section 9 of the blocking element 8a is outside of the corresponding engagement section 10 of the vehicle frame element 2.

FIG. 5c shows a highly simplified schematic detail view of the vehicle headlight system 1 in the release position FP and adjustment position VP. The engagement section 9 of the blocking element 8a is outside of the corresponding engagement section 10 of the vehicle frame element 2. In addition, the vehicle headlight housing 3 is moved relative to the vehicle frame element 2, wherein this displacement is indicated by a displacement of the blocking element 8a to the left.

The invention claimed is:

1. A shock-absorbing vehicle headlight system (1) comprising:
   at least one vehicle frame element (2) that can be fixedly connected to a vehicle,
   a vehicle headlight housing (3), held pivotably and/or displaceably on the vehicle frame element (2), having at least one guide means (4) connected to the vehicle headlight housing (3), which is preferably fixedly connected to the vehicle headlight housing (3), wherein the vehicle frame element (2) has at least one guide (5) for receiving and guiding the guide means (4), wherein the guide means (4) engages with the guide (5) such that the vehicle headlight housing (3) is guided along the guide (5) by moving the guide means (4) and thus can be pivoted and/or displaced with respect to the vehicle frame element (2), at least two release elements (6) which can be mechanically connected to a body element, in particular a bumper, of a vehicle and which are spatially spaced apart from one another, and at least one release mechanism (7a, 7b), which is at least partially connected to the vehicle frame element (2) and designed, as a function of the positions of the at least two release elements (6), to effect a transition between a basic position (GP), in which the vehicle headlight housing (3) is not pivoted and/or not displaced relative to the vehicle frame element (2), and an adjustment position (VP), in which the vehicle headlight housing (3) is displaced in a linear direction relative to the vehicle frame element (2) and/or is pivoted about a pivot axis (z), wherein the at least one release mechanism (7a, 7b) comprises:

a blocking element (8a, 8b), which is held in a linearly displaceable manner in the at least one release mechanism (7a, 7b), wherein the blocking element (8a, 8b) is designed, as a function of the positions of the release elements (6), to switch between a blocking position (BP) and a release position (FP), wherein in the blocking position (BP), an engagement section (9) of the blocking element (8a, 8b) engages with a corresponding engagement section (10) of the vehicle frame element (2) in order to hold the vehicle headlight housing (3) in the basic position (GP), wherein in the release position (FP), the engagement section (9) of the blocking element (8a, 8b) is arranged outside of the corresponding engagement section (10) of the vehicle frame element (2) in order to effect a transition of the vehicle headlight housing (3) from the basic position (GP) to the adjustment position (VP), wherein a first spring element (11a) is provided, which exerts a first spring force (f1) on the blocking element (8a, 8b), pushing it into the blocking position (BP), and a force transmission device (12), which mechanically couples the blocking element (8a, 8b) to the at least two release elements (6), wherein the force transmission device (12) comprises at least one rotary shaft (13a, 13b) and a control element (14), wherein the at least two release elements (6) are mechanically coupled to the at least one rotary shaft (13a, 13b) in such a manner that an individual displacement of each of the at least two release elements (6) can be converted into a rotary movement of the at least one rotary shaft (13a, 13b), wherein the control element (14) is mechanically coupled to the at least one rotary shaft (13a, 13b) in such a way that a rotary movement of the at least one rotary shaft (13a, 13b) can be converted into a rotary movement of the control element (14), wherein the control element (14) is operatively connected to the blocking element (8a, 8b) in such a manner that the blocking element (8a, 8b) can be pushed into the release position (FP) against the first spring force (f1) of the first spring element (11a) by means of a rotary movement of the control element (14).

2. The shock-absorbing vehicle headlight system (1) according to claim 1, wherein the at least two release elements (6) are axially spaced apart from one another along an axis of rotation (x1, x2) of the at least one rotary shaft (13a, 13b), and are mechanically coupled to the at least one rotary shaft (13a, 13b) in such a manner that the at least two release elements (6) respectively engage with the at least one rotary shaft (13a, 13b) at a radial distance from the axis of rotation (x1, x2) in order to induce a rotary movement of the at least one rotary shaft (13a, 13b) by an individual displacement of each of the at least two release elements (6).

3. The shock-absorbing vehicle headlight system (1) according to claim 1, wherein the mechanical coupling of the at least two release elements (6) to the at least one rotary shaft (13a, 13b) is respectively achieved via a connection element (15), wherein each connection element (15) projects substantially radially from the at least one rotary shaft (13a, 13b).

4. The shock-absorbing vehicle headlight system (1) according to claim 3, wherein the at least two release elements (6) are connected to the respective connection element (15) via a hinged joint (15a), preferably via a ball joint.

5. The shock-absorbing vehicle headlight system (1) according to claim 3, wherein in a state in which the shock-absorbing vehicle headlight system (1) is installed in a vehicle, the at least one rotary shaft (13a, 13b) lies substantially in a horizontal plane and the connection elements (15) lie substantially in a vertical plane.

6. The shock-absorbing vehicle headlight system (1) according to claim 1, wherein the rotary movement of the at least one rotary shaft (13a, 13b) that can be induced by the at least two release elements (6) and the rotary movement that is transferred from the at least one rotary shaft (13a, 13b) to the control element (14) have the same direction of rotation.

7. The shock-absorbing vehicle headlight system (1) according to claim 1, wherein the control element (14) is substantially non-rotatably connected to the at least one rotary shaft (13a, 13b).

8. The shock-absorbing vehicle headlight system (1) according to claim 1, wherein the force transmission device (12) has at least two adjacent rotary shafts (13a, 13b), wherein a first rotary shaft (13a) and a second rotary shaft (13b) are respectively mechanically coupled to at least two release elements (6), wherein the first rotary shaft (13a) and the second rotary shaft (13b) are oriented to one another in such a way that an axis of rotation (x1) of the first rotary shaft (13a) and an axis of rotation (x2) of the second rotary shaft (13b) are oriented at an angle of at least 5°, preferably between 10° and 30°, to one another, wherein precisely one control element (14) is preferably arranged between adjacent rotary shafts (13a, 13b).

9. The shock-absorbing vehicle headlight system (1) according to claim 1, wherein the rotary movement of the control element (14) pushing the blocking element (8a, 8b) into the release position (FP) against the first spring force (f1) of the first spring element (11a) requires a rotation of the control element (14) by at least 10°, preferably at least particularly preferably at least 30°.

10. The shock-absorbing vehicle headlight system (1) according to claim 1, wherein the control element (14) is operatively connected to the blocking element (8a, 8b) via an unlocking element (16) arranged in a linearly displaceable manner in the at least one release mechanism (7a, 7b) in such a manner that a rotary movement of the control element (14) can be converted into a linear displacement of the unlocking element (16), wherein the unlocking element (16) is designed to engage with the blocking element (8a, 8b) such that in engagement, the linear displacement of the unlocking element (16) pushes the engagement section (9) of the blocking element (8a, 8b) into the release position (FP).

11. The shock-absorbing vehicle headlight system (1) according to claim 10, wherein the unlocking element (16) has a substantially wedge-shaped contact section (16a), which is designed to engage with a contact section (9a) of the blocking element (8a, 8b) that is complementary to the contact section (16a) of the unlocking element (16), wherein during the transition of the blocking element (8a, 8b) into the release position (FP), the contact section (16a) of the unlocking element (16) contacts the contact section (9a) of the blocking element (8a, 8b) for force transmission.

12. The shock-absorbing vehicle headlight system (1) according to claim 1, wherein the shock-absorbing vehicle headlight system (1) has at least two release mechanisms (7a, 7b), wherein a first release mechanism (7a) is arranged on an upper side of the vehicle headlight housing (3) and a second release mechanism (7b) is arranged on an opposite lower side of the vehicle headlight housing (3), wherein starting from each release mechanism (7a, 7b), a mechanical arm (17a, 17b) coupled to the respective blocking element (8a, 8b) and displaceable together therewith extends substantially in the direction of the opposite release mechanism (7a, 7b), wherein a rocker (17c) is formed between the two release mechanisms (7a, 7b), wherein the arms (17a, 17b) engage with opposing ends of the rocker (17c) such that a downwards movement of the arm (17a) of the upper release mechanism (7a) is converted into an upwards movement of the arm (17b) of the lower release mechanism (7b), whereby a mechanical release of the two release mechanisms (7a, 7b) is coupled together, wherein a displacement of the first blocking element (8a) during the transition into its release position and a displacement of the second blocking element (8b) coupled thereto during the transition into its release position preferably occurs along a trajectory running in opposite, preferably anti-parallel, directions.

13. The shock-absorbing vehicle headlight system (1) according to claim 1, wherein a second spring element (11b) is arranged between the vehicle frame element (2) and the vehicle headlight housing (3) and is designed to push the vehicle headlight housing (3) into the basic position (GP) by means of a second spring force (f2) such that the transition into the adjustment position (VP) occurs against the second spring force (f2).

14. The shock-absorbing vehicle headlight system (1) according to claim 1, wherein the guide (5) for receiving and guiding the guide means (4) is formed as a straight or arc-shaped elongated hole.

15. A motor vehicle comprising the shock-absorbing vehicle headlight system according to claim 1.

* * * * *